United States Patent
Wood et al.

(10) Patent No.: US 6,959,778 B2
(45) Date of Patent: Nov. 1, 2005

(54) TRANSFER CASE HAVING ELECTROMAGNETIC SYNCHRONIZER AND BRAKE

(75) Inventors: Scott P. Wood, Westland, MI (US); David Owen, Glen Iris (AU); John Merte, Sterling Hts., MI (US)

(73) Assignee: BorgWarner, Inc., Auburn Hills, MI (US)

( * ) Notice: Subject to any disclaimer, the term of this patent is extended or adjusted under 35 U.S.C. 154(b) by 148 days.

(21) Appl. No.: 10/649,542

(22) Filed: Aug. 26, 2003

(65) Prior Publication Data

US 2005/0045401 A1 Mar. 3, 2005

(51) Int. Cl.[7] .............................................. F16H 48/20
(52) U.S. Cl. ...................................... 180/248; 475/154
(58) Field of Search ................................ 180/248, 249, 180/250; 475/154

(56) References Cited

U.S. PATENT DOCUMENTS

| | | | |
|---|---|---|---|
| 4,458,557 A | 7/1984 | Hayakawa | |
| 5,039,305 A | 8/1991 | Pierce | |
| 5,046,999 A | 9/1991 | Liu et al. | |
| 5,061,229 A | 10/1991 | Tsukamoto et al. | |
| 5,334,116 A | 8/1994 | Baxter, Jr. | |
| 5,842,947 A | 12/1998 | Weilant | |
| 5,961,414 A | 10/1999 | Beim et al. | |
| 6,093,125 A | 7/2000 | McCarrick et al. | |
| 6,170,921 B1 | 1/2001 | Naerheim | |
| 6,623,395 B2 * | 9/2003 | Lovatt ........................ | 475/204 |
| 6,631,779 B2 * | 10/2003 | Watson et al. .............. | 180/248 |
| 2002/0142877 A1 * | 10/2002 | Williams et al. ............ | 475/198 |
| 2004/0176207 A1 * | 9/2004 | Suydam et al. ............. | 475/223 |
| 2004/0180747 A1 * | 9/2004 | Weilant et al. .............. | 475/154 |

* cited by examiner

Primary Examiner—Kevin Hurley
(74) Attorney, Agent, or Firm—Brinks Hofer Gilson & Lione; Greg Dzieglielewski

(57) ABSTRACT

A motor vehicle transfer case includes an interaxle differential driven by an input shaft and an electromagnetic synchronizer and brake for synchronizing and braking rotation of the input and secondary output shaft. An electromagnetic coil is mounted within the transfer case about the input shaft and surrounded by a freely rotatable rotor. A circular armature is coupled to a chain drive sprocket adjacent the rotor and the electromagnetic coil. The chain drive sprocket is driven by the secondary output of the interaxle differential, the other output of which drives the primary transfer case output. Energization of the electromagnetic coil attempts to synchronize and brake rotation of the input shaft and the chain drive sprocket and secondary driveline and maintains the slack or lash in the driveline in a constant state to eliminate noise and driveline transients.

20 Claims, 3 Drawing Sheets

TRANSFER CASE HAVING ELECTROMAGNETIC SYNCHRONIZER AND BRAKE

BACKGROUND OF THE INVENTION

The invention relates generally to electromagnetic synchronizers and brakes for motor vehicle transfer cases and more particularly to an electromagnetic synchronizer and brake for the input and secondary output of a motor vehicle transfer case having an interaxle differential.

Many four-wheel drive motor vehicles and sport utility vehicles or pick-up trucks equipped with four-wheel drive utilize a transfer case coupled to the output of the transmission to distribute drive torque to the front and rear axles of the vehicle. These transfer cases incorporate many diverse mechanical devices which may provide, among other features, a reduced speed (low gear) drive mode, interaxle speed differentiation and manual or automatic engagement of an interaxle clutch which selectively reduces prop shaft speed differences or positively drives both front and rear prop shafts.

Significant developments have been made with regard to systems which sense wheel speed differences and engage interaxle clutches to reduce such speed differences. An automatically engaging system is disclosed, for example, in co-owned U.S. Pat. No. 5,407,024.

In addition to developments directed to enhancing the flexibility and operation of such drive system are developments directed to providing smooth, silent and imperceptible operation of the vehicle drive system under all operating conditions.

One condition that has recently been subjected to scrutiny is the clunk or thunk which occurs when the vehicle driveline suddenly changes state from driving or accelerating to coasting. During this change, the direction of rotational clearances in the driveline components is reversed and the shift of the accumulated slack or lash frequently results in a clunk or thunk. In severe cases, a slight impulse or lurch is transmitted to the vehicle body and its occupants. The present invention is directed to this problem.

SUMMARY OF THE INVENTION

A motor vehicle transfer case includes an interaxle differential driven by an input shaft and an electromagnetic synchronizer and brake for synchronizing and braking rotation of the input and secondary output shaft. An electromagnetic coil is mounted within the transfer case about the input shaft and surrounded by a freely rotatable rotor. A circular armature is coupled to a chain drive sprocket adjacent the rotor and the electromagnetic coil. The chain drive sprocket is driven by the secondary output of the interaxle differential, the other output of which drives the primary transfer case output. Energization of the electromagnetic coil attempts to synchronize and brake rotation of the input shaft and the chain drive sprocket and secondary driveline and maintains the slack or lash in the driveline in a constant state to eliminate noise and driveline transients.

Thus it is an object of the present invention to provide a transfer case having an electromagnetic synchronizer and brake.

It is a further object of the present invention to provide a transfer case having an electromagnetic synchronizer and brake for synchronizing and braking motion of the input and the secondary output.

It is a still further object of the present invention to provide an electromagnetic coil disposed about the input shaft of a transfer case for synchronizing and braking rotation of the input and a chain drive sprocket.

It is a still further object of the present invention to provide an electromagnetic synchronizer and brake on the secondary output of a transfer case that eliminates noise and driveline transients relating to a state reversal of driveline slack or lash.

Further objects and advantages of the present invention will become apparent by reference to the following description of the preferred embodiment and appended drawings wherein like reference numbers refer to the same component, element or feature.

DETAILED DESCRIPTION OF THE PREFERRED EMBODIMENT

Figure 1:
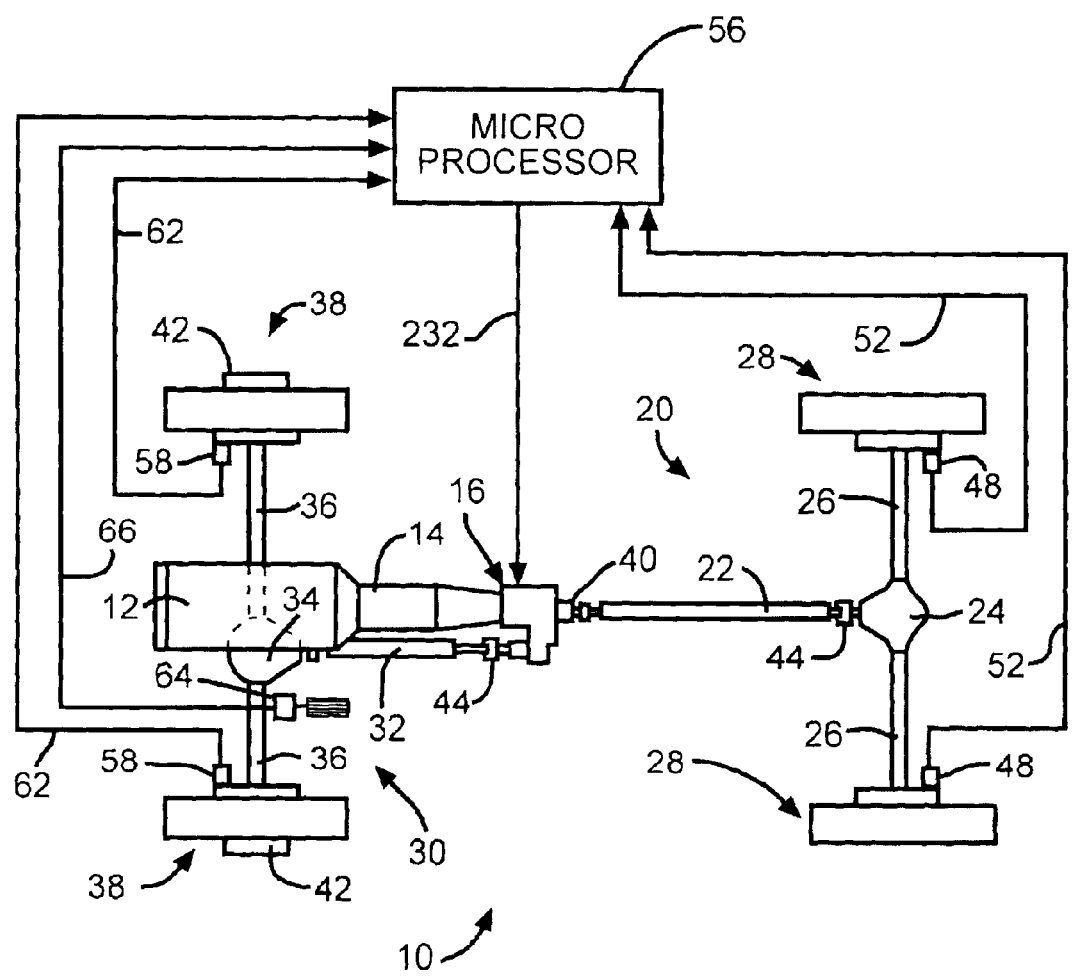
FIG. 1 is a diagrammatic view of a motor vehicle powertrain having a transfer case incorporating the present invention.

Referring now to FIG. 1, a four-wheel vehicle powertrain utilizing the present invention is diagrammatically illustrated and designated by the reference number 10. The four-wheel vehicle powertrain 10 includes a prime mover 12 such as an internal combustion engine having an output which is coupled to and directly drives a transmission 14. The output of the transmission 14 directly drives a transfer case assembly 16 which provides motive power to a primary or rear drive driveline 20 comprising a primary or rear prop shaft 22, a primary or rear differential 24, a pair of live primary or rear axles 26 and a respective pair of primary or rear tire and wheel assemblies 28.

The transfer case assembly 16 also selectively provides motive power to a secondary or front driveline 30 comprising a secondary or front prop shaft 32, a secondary or front differential 34, a pair of live secondary or front axles 36 and a respective pair of secondary or front tire and wheel assemblies 38. The front tire and wheel assemblies 38 may be directly coupled to a respective one of the front axles 36 or, if desired, a pair of manually or remotely activatable locking hubs 42 may be operably disposed between the front axles 36 and a respective one of the tire and wheel assemblies 38 to selectively connect same. Finally, both the primary driveline 20 and the secondary driveline 30 may include suitable and appropriately disposed universal joints 44 which function in conventional fashion to allow static and dynamic offsets and misalignments between the various shafts and components.

Disposed in sensing relationship with each of the rear tire and wheel assemblies 28 is a wheel speed sensor 48. Preferably, the wheel speed sensors 48 may be the same sensors utilized with, for example, an antilock brake system (ABS) or other vehicle control or traction enhancing system (not illustrated). Alternatively, a single sensor, disposed to sense rotation of the primary or rear prop shaft 22 may be utilized. Signals from the sensors 48 are provided in lines 52 to a microprocessor 56. Similarly, disposed in sensing relationship with the front tire and wheel assemblies 38 are respective wheel speed sensors 58 which provide signals to the microprocessor 56 in lines 62. Once again, the sensors 58 may be a part of or shared with an antilock brake system or other vehicle traction enhancing system (not illustrated). A throttle position sensor 64 such as a potentiometer or other device providing a position proportional signal having good definition in a line 66 to the microprocessor 56 may also be included.

Figure 2:
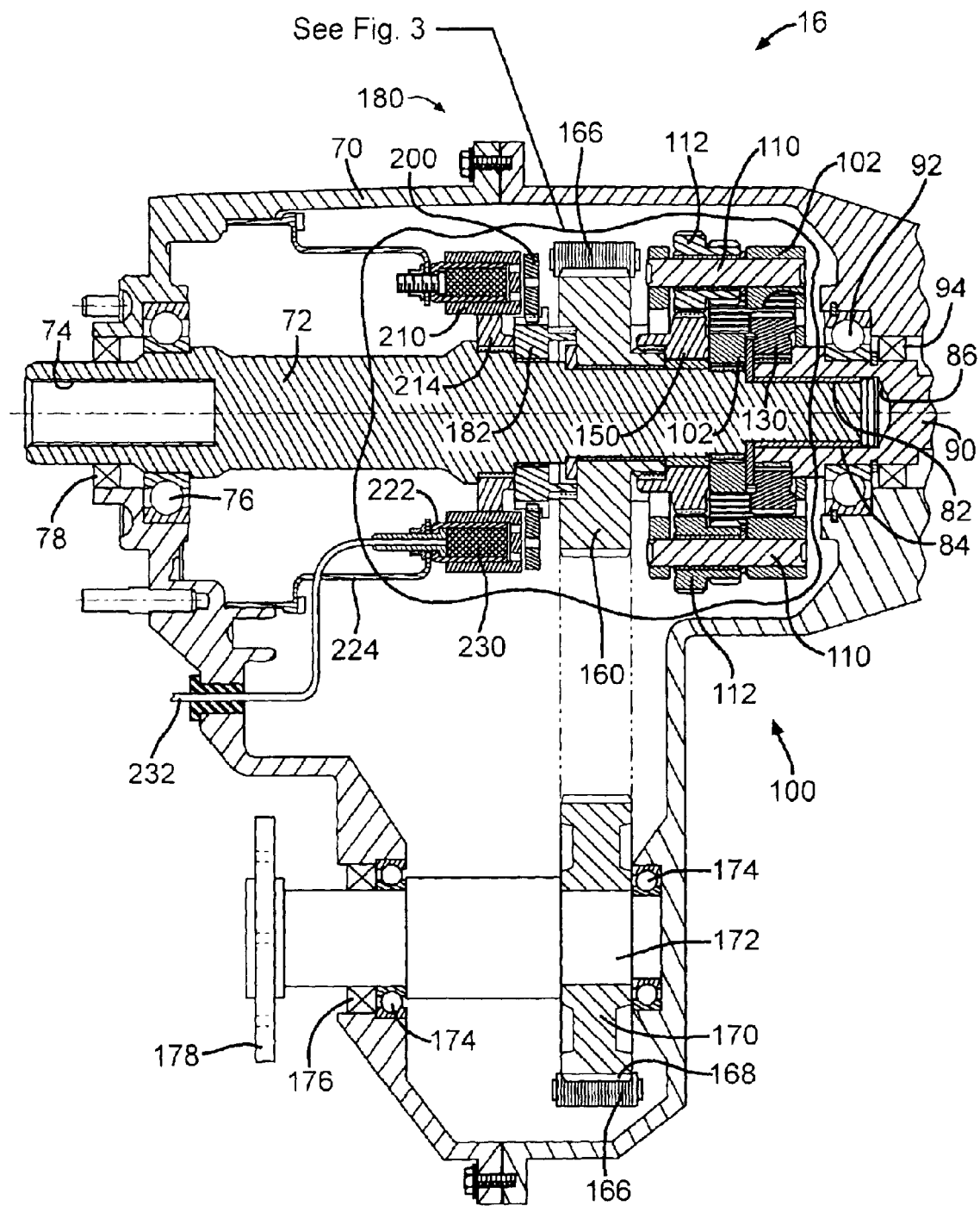
FIG. 2 is a full sectional view of a motor vehicle transfer case incorporating the present invention.

Referring now to FIG. 2, the transfer case assembly 16 includes a multiple piece, cast metal housing 70 having multiple and diverse openings, apertures, counterbores, ledges, slots and planar surfaces for receiving bearings, gaskets, seals and various fixed and rotating components of the transfer case assembly 16 as will be readily appreciated. Among those components is an input shaft 72 having a plurality of female splines or internal gear teeth 74 which receive a complementarily splined output shaft (not illustrated) of the transmission 14 illustrated in FIG. 1. The end of the input shaft 72 proximate the splines or gear teeth 74 is supported by an antifriction bearing such as a ball bearing assembly 76. An oil seal 78 provides an appropriate fluid tight seal between the input shaft 72 and the cast metal housing 70. The input shaft opposite the female splines or gear teeth 74 narrows to a smaller diameter region 82 surrounded by a journal bearing 84 which, in turn, is received within a counterbore 86 of a primary output shaft 90. The primary output shaft 90, in turn, is freely rotatably supported upon a ball bearing assembly 92. An oil seal 94 disposed between the primary output shaft 90 and the housing 70 provides an appropriate fluid tight seal therebetween.

Figure 3:
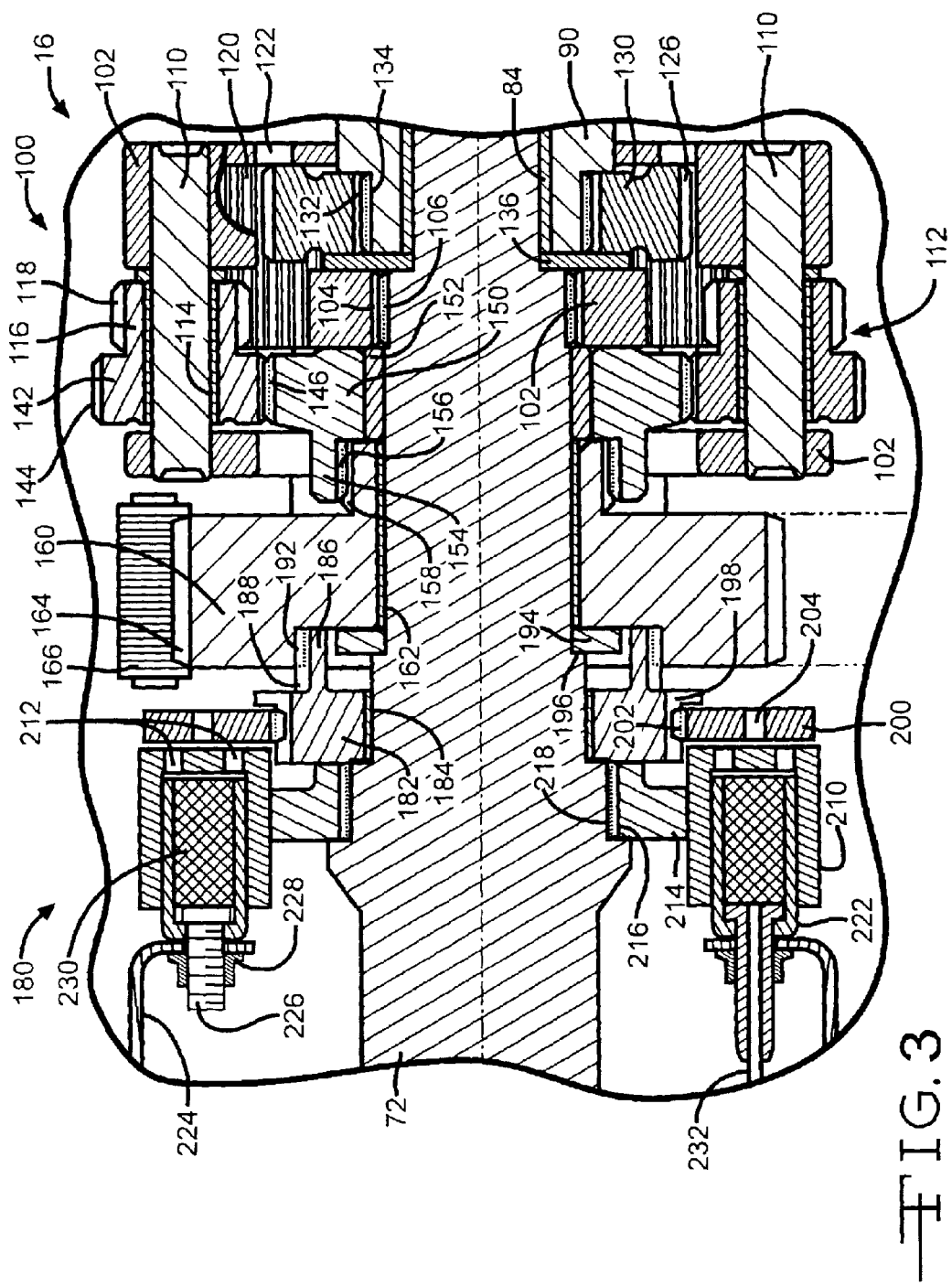
FIG. 3 is an enlarged, fragmentary view of a motor vehicle transfer case incorporating the present invention.

Referring now to FIGS. 2 and 3, the transfer case 16 includes an interaxle differential assembly 100. The interaxle differential assembly 100 includes a carrier 102 which is concentrically disposed about the input shaft 72. The carrier 102 is directly coupled to the input shaft 72 by a set of centrally axially disposed internal or female splines or gear teeth 104 which mate with complementarily configured male splines or gear teeth 106 formed on the input shaft 72. The carrier 102 supports a plurality of stub shafts 110 which are positively secured to the carrier 102. Each of the stub shafts 110 supports a stepped planet gear 112 received upon a friction reducing component such as a journal bearing 114 or roller bearing assembly. Each of the stepped planet gears 112 defines a smaller diameter gear 116 having gear teeth 118 which mesh with a circumferentially offset straight planet gear 120. The planet gears 120 are supported for rotation on respective stub shafts 122, one of which is illustrated in FIG. 3. The straight planet gear 120 is in constant engagement with male or external gear teeth 126 formed on a primary output drive collar 130. The primary output drive collar 130 includes internal or female splines or gear teeth 132 which mate with complementarily configured male splines or gear teeth 134 on the primary output shaft 90. A flat, preferably antifriction, washer 136 reduces friction and maintains axial separation between the carrier 102, the primary output drive collar 130 and the primary output shaft 90.

A larger diameter portion 142 of each of the stepped planet gears 112 includes gear teeth 144. The gear teeth 144 mesh with male or external gear teeth 146 on a secondary output drive collar 150. The secondary output drive collar 150 is freely rotatably supported upon a journal bearing 152 concentrically disposed about the input shaft 72. The secondary output drive collar 150 includes an axial annular extension 154 having internal or female splines or gear teeth 156 which are complementary to and engage male or external splines or gear teeth 158 formed on a chain drive sprocket 160. The chain drive sprocket 160 is also freely rotatably supported about the input shaft 72 on a journal bearing 162. The chain drive sprocket 160 includes exterior chain drive teeth 164 which engage a drive chain 166.

As illustrated in FIG. 2, the drive chain 166 extends about and engages teeth 168 on a driven chain sprocket 170. The driven chain sprocket 170 is secured by any suitable means such as interengaging splines, welding, drive pins or an interference fit or may be integrally formed with a secondary output shaft 172. The secondary output shaft 172 is freely rotatably supported upon a pair of antifriction bearings such as two ball bearing assemblies 174. An oil seal 176 adjacent the forward ball bearing assembly 174 provides an appropriate fluid tight seal between the secondary output shaft 172 and the transfer case housing 70. To facilitate coupling of the secondary output shaft 172 to associated components of the secondary driveline 30, as illustrated in FIG. 1, a flange 178 may be secured to the secondary output shaft 172 by any suitable fastening means.

Referring now again to FIG. 3, the transfer case assembly 16 also includes an electromagnetic synchronizer and brake assembly 180. The electromagnetic synchronizer and brake assembly 180 includes a drive collar 182 which is freely rotatably disposed upon the input shaft 72 on a coaxially disposed journal bearing 184. The drive collar 182 includes an axially extending annular portion 186 having male splines or gear teeth 188 which engage complementarily configured female splines or gear teeth 192 formed in the chain drive sprocket 160. Accordingly, the drive collar 182 rotates in unison with the chain drive sprocket 160. A flat washer 194 cooperates with a step 196 on the input shaft 72 to define the axial limit of travel the chain drive sprocket 160 in one direction. The drive collar 182 includes male or external spines or gear teeth 198 on its periphery which engage and drive an annular plate or armature 200 having complementarily configured internal or female splines or gear teeth 202. The armature 200 includes a plurality of arcuate, discontinuous, circumferentially aligned banana slots 204. Immediately axially adjacent the armature 200 is a rotor 210. The rotor 210 is U-shaped in cross-section and includes a region facing the armature 200 defining two sets of discontinuous, arcuate, circumferentially aligned banana slots 212 having distinct diameters. Preferably, the average of the diameters of the two rows of banana slots 212 in the rotor 210 is approximately equal to the diameter of the single row of banana slots 204 in the armature 200. The banana slots 204 and 212 act as flux concentrators to enhance magnetic attraction between the armature 200 and the rotor 210. The rotor 210 is mounted upon and secured to a rotor collar 214 having internal or female splines or gear teeth 216 which mate with complementarily configured external or male splines 218 formed on the input shaft 72. Hence, the rotor 210 and the rotor collar 214 rotate in unison with the input shaft 72.

Disposed within the interior of the rotor 210 is a coil housing 222 which is attached to an internal bracket 224 within the transfer case housing 70 and secured thereto by appropriate fasteners such as a plurality of threaded studs 226 and nuts 228. Within the coil housing 222 is an electromagnetic coil 230 which is provided with electrical energy through a single or multiple conductor electrical cable 232.

In operation, the electromagnetic synchronizer and brake assembly 180 according to the present invention, improves the quietness and smoothness of vehicle operation by minimizing or eliminating the transient and noise (a clunk or thunk) which may result from a relatively abrupt change from accelerating to coasting or vice versa as the direction of rotational clearances within the components of the vehicle powertrain reverses. Hence, when either the throttle position sensor 64 or a properly conditioned and summed signal from the wheel speed sensors 48 and 58 indicates an event which will result in a change of the primary driveline 20 and secondary driveline 30 from a condition of accelerating to coasting or vice versa, the microprocessor 56, according to internal software or subroutines, generates a preferably modulating electrical signal which is supplied to the electromagnetic coil 230 through the electrical cable 232. Such modulation may be achieved by a pulse width modulation (PWM) electrical control or by any other system which provides modulating or proportional control of the intensity or level of the electrical signal provided to the electromagnetic coil 230.

Energization of the electromagnetic coil 230 generates electromagnetic flux which urges the armature 200 toward the rotor 210, thereby generating friction and frictional coupling therebetween. Since the armature 200 is coupled to the chain drive sprocket 160 of the secondary driveline 30 and the rotor 210 is splined to the input shaft 72, the components of the electromagnetic synchronizer assembly 180 attempt to synchronize the speeds of the input shaft 72 and the chain drive sprocket 160.

Additionally, it should be understood that inasmuch as the electromagnetic coil 230 and the coil housing 222 are stationary, energization of the electromagnetic coil 230 also generates drag which will attempt to slow or brake the rotational speed of the rotor 210 and the input shaft 72 and, through the frictional coupling between the rotor 210 and the armature 200 also brake the chain drive sprocket 160 and the secondary driveline 30. The braking action or drag generated by the electromagnetic synchronizer and brake assembly 180, is relatively slight, however, as the coupling and thus braking it provides is small in comparison to the energy and torque residing in the transfer case assembly 16, the primary driveline 20 and the secondary driveline 30 when the motor vehicle powertrain 10 is operating. It is, however, sufficient to maintain the direction of rotational clearances such that a transient associated with a change in operating state from accelerating to coasting or vice versa does not generate a clunk, thunk or impulse in the powertrain 10.

Energization of the electromagnetic coil 230 while the vehicle is undergoing change from acceleration to coasting or vice versa, assists in maintaining the direction of rotational clearances and allows such clearances to change gradually rather than quickly and thus minimizes or eliminates the noise generating transient which might otherwise accompany such change of direction of rotational clearances within the components of the motor vehicle powertrain 10.

The foregoing disclosure is the best mode devised by the inventors for practicing this invention. It is apparent, however, that devices incorporating modifications and variations will be obvious to one skilled in the art of transfer case synchronizers and clutches and brakes. Inasmuch as the foregoing disclosure is intended to enable one skilled in the pertinent art to practice the instant invention, it should not be construed to be limited thereby but should be construed to include such aforementioned obvious variations and be limited only by the scope and spirit of the following claims.

We claim:

1. A motor vehicle transfer case comprising, in combination, an input shaft;

a primary output shaft;

a chain drive sprocket disposed about said input shaft;

a secondary output having a driven chain sprocket;

a chain engaging said sprockets;

an interaxle differential having an input driven by said input shaft, a first output coupled to said primary output shaft, and a second output coupled to said chain drive sprocket;

an armature coupled to said chain drive sprocket;

a rotor disposed adjacent said armature and coupled to said input shaft; and an electromagnetic coil disposed adjacent said rotor.

2. The motor vehicle transfer case of claim 1 wherein said input shaft is adapted to be driven by an output of a transmission.

3. The motor vehicle transfer case of claim 1 further including a housing adapted to rotatably receive said shafts.

4. The motor vehicle transfer case of claim 1 wherein said armature is a circular plate and said rotor is U-shaped in cross-section and partially surrounds said electromagnetic coil.

5. The motor vehicle transfer case of claim 1 wherein said electromagnetic coil is driven by an output of a microprocessor.

6. The motor vehicle transfer case of claim 1 further including a microprocessor having an output driving said electromagnetic coil and a throttle position sensor providing a signal to said microprocessor.

7. The motor vehicle transfer case of claim 1 wherein said armature and said rotor define pluralities of discontinuous arcuate slots.

8. A transfer case having an electromagnetic drag assembly, comprising, in combination:

an input shaft;

a primary output shaft;

a secondary output shaft;

an interaxle differential having an input driven by said input shaft, a first output coupled to said primary output shaft, and a second output driving said secondary output shaft;

an electromagnetic synchronizer and brake assembly having a first member coupled to said second output, a second member disposed adjacent said first member and coupled to said input shaft and a stationary electromagnetic coil disposed adjacent said second member.

9. The transfer case of claim 8 further including a housing adapted to rotatably receive said shafts.

10. The transfer case of claim 8 wherein said first member is a plate and said second member is U-shaped in cross-section and partially surrounds said electromagnetic coil.

11. The transfer case of claim 8 further including a chain drive sprocket disposed on said input shaft and coupled to said second output of said differential, a driven chain sprocket coupled to said secondary output shaft and a chain engaging said sprockets.

12. The transfer case of claim 8 wherein said first and said second members are circular and define a plurality of discontinuous arcuate slots.

13. The transfer case of claim 8 wherein said interaxle differential includes planet gears and a carrier driven by said input shaft.

14. An electromagnetic synchronizer and brake for a motor vehicle powertrain component, comprising, in combination:

an interaxle differential having an input, adapted to be driven by an output of a transmission, a first output adapted to drive a first driveline and a second output adapted to drive a second driveline; and an electromagnetic synchronizer and brake assembly having a first member coupled to said second output for rotation therewith, a second member disposed adjacent said first member and coupled to said input for rotation therewith and a stationary electromagnetic coil;

whereby energization of said electromagnetic coil synchronizes and brakes rotation of said input and said second output.

15. The synchronizer and brake assembly of claim 14 further including an input shaft for driving said input, a primary output shaft driven by said first output and a secondary output shaft driven by said second output.

16. The synchronizer and brake assembly of claim 15 further including a first chain sprocket coupled to said first member, a second chain sprocket coupled to said secondary output shaft and a chain engaging said sprockets.

17. The synchronizer and brake assembly of claim 14 wherein said first member is a circular plate having a plurality of arcuate, spaced apart slots.

18. The synchronizer and brake assembly of claim 14 wherein said second member is U-shaped in cross-section and partially surrounds said electromagnetic coil.

19. The synchronizer and brake assembly of claim 18 wherein said second member further includes at least one circular discontinuous path of arcuate slots.

20. The synchronizer and brake assembly of claim 14 wherein said interaxle differential includes a carrier driven by said input, a first plurality of stepped planet gears and a second plurality of straight planet gears.

* * * * *